United States Patent Office 3,586,635
Patented June 22, 1971

3,586,635
PROCESS FOR THE PREPARATION OF METAL SILICATE PHOSPHORS
Milton C. Vanik, Severna Park, and Robert W. McKinney, Adelphi, Md., assignors to W. R. Grace & Co., New York, N.Y.
No Drawing. Filed May 2, 1968, Ser. No. 726,207
Int. Cl. C09k 1/54
U.S. Cl. 252—301.6F          6 Claims

ABSTRACT OF THE DISCLOSURE

Calcium metal silicate and zinc orthosilicate phosphors are produced using a continuous homogeneous precipitation technique. Precipitation of a reactive hydrous oxide intermediate under intensive mixing conditions, followed by spray drying, washing, drying and calcination yields the desired fluorescent material.

---

This invention relates to a method for preparing metal silicate phosphors and more particularly is concerned with a method of making zinc orthosilicate and calcium meta silicate phosphors.

These phosphors are fluorescent materials which are rendered luminescent by impinging radiation, such as ultraviolet rays, X-rays, cathode rays, etc. The phosphors are particularly useful in fluorescent lamps, cathode ray tubes, various display devices, on postage stamps, etc.

Natural silicate phosphors such as zinc orthosilicate (willemite) upon ultraviolet irradiation exhibits brilliant green fluorescent color while calcium meta silicate (wollastonite) fluoresces with a red-orange color. Various synthetic routes incorporate activator salts such as leads and/or manganese to achieve phosphors which exhibit the properties of the naturally occurring fluorescent metal silicates.

In the conventional methods, salts of either calcium, or zinc along with the activator salts are mixed dry (or with liquid or solid flux) with silica. The mixture is ground or ball-milled and then fired.

The dissemination of the activator salts in the silicate matrix is critical to the preparation of the silicate phosphors. With the conventional techniques, it is difficult to achieve a sufficiently homogeneous mixture which is also a highly reactive intermediate. Usually this lack necessitates the use of more severe calcination conditions in order to produce a phosphor with increased efficiency. Likewise these methods cause problems in control of the particle size.

It is an object of this invention to prepare metal silicate phosphors activated with manganese and/or lead salts utilizing a combination of steps which yield a product with increased homogeneity which exhibits good fluorescent properties. The uniform particle size of the products of this invention results in easier dispersion in vehicles such as printing inks.

Likewise, the invention provides a method of preparing the homogeneous silicate phosphors on a continuous basis and thus increases the efficiency of large scale productions.

Broadly, the process of this invention comprises the steps of precipitating a reactive hydrous oxide intermediate under intensive mixing conditions, spray drying, washing, drying, calcining and recovering the desired metal silicate phosphor.

The metal silicates of this invention are prepared first by mixing solutions containing desired matrix metal and activator compound with a source of silica under continuous intensive conditions. Materials may be employed which upon reacting yield the metal oxides, for instance in the preparation of zinc orthosilicate, the desired ZnO. Similarly various compounds may be utilized as the source of the manganese and lead activators. Satisfactory results have been attained if starting materials are selected for soluble metal salts such as nitrates, chlorides, sulfates and acetates.

An excellent source of silica is a solution of an alkali metal silicate such as sodium or potassium silicate. Silica hydrogel can likewise be used.

As in prior art methods for preparing phosphors, a fluxing agent may be used, if desired. Alkali metal fluorides, such as NaF, LiF, $NH_4F$ etc. are common fluxing agents.

Generally stoichiometric amounts of the metal oxide and silica source are utilized. In the case of the calcium meta silicate, a slight excess of silica may be employed. The molar ratio of $CaO/SiO_2$ may vary from 0.8:1.0 to 1.5:1.0, preferably from 0.9:1.0 to 1.0:1.0. In the zinc orthosilicate, the molar ratio of $ZnO/SiO_2$ may vary from 1.6:1.0 to 3.0:1.0, preferably 1.8:1.0 to 2.00;1.00.

In the preparation of wollastonite, favorable proportions of activating agents are between about 0.001 to 0.20 gram-atoms of manganese per mole of $SiO_2$ and 0.0005 to 0.10 gram-atoms of lead per mole of $SiO_2$. Satisfactory results are obtained if activator sources are used which would give between about 0.02 to 0.10 gram-atoms of manganese and 0.01 to 0.05 gram-atoms of lead per mole of $SiO_2$. In the case of willimite, the activator may be between about 0.001 to 0.20 gram-atoms of manganese, preferably 0.01 to 0.06 gram-atoms of manganese, per mole of $SiO_2$.

The slurry of this invention can be satisfactorily prepared by using a device designated as a hydrous oxide reactor. This device is capable of producing instantaneous, homogeneous, finely divided precipitates on a continuous basis. The equipment consists of metering pumps which deliver volumes of feed materials into a mixing chamber. The flow rates may vary from about 50 ml./min. to 500 ml./min. The ratio of the rates of the solution is adjusted accordingly to yield the desired stoichiometry. The chamber, jacketed for heating and cooling, is equipped with a high speed stirrer. The entering fluids are ejected from nozzles into the chamber which has been designed to effect extremely rapid mixing—about 2000 to 16,000 revolutions per minute—in very short times. The reactants are mixed thoroughly until the calculated final pH valve is attained. The resultant product, a hydrous intimately mixed reactive precipitate is then spray dried.

The slurry is sprayed as a fine mist into a drying chamber heated by suitable means, such as the combustion of propane. The mist is introduced into the top of the spray dryer, where it contacts a countercurrent flow of hot gases in its downward flight, and settles at the bottom as solid, dry, spheroidal particles of substantially uniform size and shape. Control of the particle size may be effected by controlling the characteristics of both the nozzle or spraying device and the reaction mixture. For instance, the pressure applied in introducing the solution through the spray nozzle, its viscosity, temperature and composition will influence the particle size.

The spray dried material is then washed to remove excess salts. Washing is usually done with deionized water adjusted with ammonia, to the desired pH value.

The washed product may then be dried by any conventional method. The drying may be accomplished in a forced draft oven at temperatures between 130 and 160° C. for several hours. Usually drying at 150° C. for one hour is sufficient.

Calcination is the final step of the process. When the composite oxide system is calcined, the metal silicate crystallites grow from the nucleate metal salt and diffuse thru the silica, carrying any activator ion present.

In the process of this invention the previous steps of homogeneous precipitation and spray drying have already produced a precalcination complex which possesses decreased activator requirements. At this point, the metallic oxides may be fired in air or steam at temperatures between about 1750 and 2320° F. for from one to two hours, preferably for 1.5 hours. Calcination can be accomplished in Alundum boats placed in either muffle or Burrell electric tube furnaces.

This calcination step yields crystalline phosphors which upon exposure to UV irradiation exhibit very satisfactory fluorescent properties.

This invention is illustrated, but not limited by the following examples.

EXAMPLE I

The two solutions for the continuous homogeneous precipitation of calcium meta silicate are prepared as follows:

Solution A

|  | G. |
|---|---|
| Sodium silicate solution (8.7% $Na_2O$, 28.0% $SiO_2$) | 2380 |
| Deionized water | 4000 |

Solution B

| | |
|---|---|
| $Ca(NO_3)_2 \cdot 4H_2O$ | 2320 |
| $Mn(NO_3)_2$ (50% solution) | 185 |
| $Pb(NO_3)_2$ | 46.9 |
| NaF | 23.8 |
| Deionized water | 4000 |

Both solutions were fed simultaneously into a mixing chamber (hydrous oxide reactor) where very high speed (3500 r.p.m.) intensive mixing takes place. (A) was fed at 100 ml./min., (B) at 107 ml./min. The pH of the reactor effluent was 8.8 at 25° C.

The slurry was then spray dried at 330° F. The resultant powder was washed in a filter with deionized water at pH 8.5–9.0 (adjusted with $NH_4OH$) until there was no test for sodium by flame.

The cake was predried in a forced air oven at 150° C. for 1 hour. Two separate samples were weighed into Alundum boats and calcined in a muffle furnace under constant steam atmosphere at different temperatures. One was calcined at 2000° for 1½ hours while the other sample was at 2320° F. for 1½ hours. Both materials were subjected to ultraviolet exposure and fluoresced red under a mercury lamp. X-ray diffraction studies indicated the crystalline phases to be well defined calcium meta silicate, wollastonite form.

EXAMPLE II

Two solutions for the precipitation of zinc orthosilicate were prepared as follows:

Solution A

|  | G. |
|---|---|
| Potassium silicate solution (19.9% $SiO_2$, 9.05% $K_2O$) | 1497 |
| KOH | 996 |
| Deionized water | 2000 |

Solution B

| | |
|---|---|
| $ZnCl_2$ | 1338 |
| $MnCl_2 \cdot 4H_2O$ | 18.8 |
| Deionized $H_2O$ | 5000 |

Both solutions were fed into the high speed mixing reactor described in the previous example. (A) was fed at the rate of 100 ml./min., (B) at the rate of 151 ml./min. The pH of the effluent from the mixing reactor was 6.85 at 25° C.

The slurry from the mixing reactor was spray dried at 330° F. The spray dried material was washed with deionized water, adjusted with $NH_3$ to pH=9.2, until there was no test for chloride using $AgNO_3$.

The washed material was predried and calcined in air at 2320° F. for 1½ hours in a Burrell electric tube furnace. The product was white powder which fluoresced with a bright green color under a mercury lamp. X-ray diffraction indicated the product to be well defined zinc orthosilicate, willemite form.

EXAMPLE III

Another sample of calcium meta silicate was made from the two solutions prepared as follows:

Solution A

|  | G. |
|---|---|
| Potassium silicate solution (9.05% $K_2O$, 19.9% $SiO_2$) | 3200 |
| KOH (86.5% solution) | 750 |
| $PbCl_2$ | 27.8 |
| Deionized $H_2O$ | 3000 |

Solution B

| | |
|---|---|
| $CaCl_2 \cdot 2H_2O$ | 1470 |
| $MnCl_2 \cdot 4H_2O$ | 98.9 |
| Deionized $H_2O$ | 6000 |

Both solutions were fed into the high speed mixing reactor described in Example I. (A) was fed at 100 ml./min., (B) at 110 ml./min. The pH of the reactor effluent was 10.5.

The slurry was then spray dried at 330° F. The resultant powder was washed with deionized $H_2O$, adjusted to pH 7.2 with $NH_4OH$, until there was no chloride test with $AgNO_3$.

The cake was predried and two samples were calcined in air, one at 1800 and the other 2000° F. for 1½ hours. Both materials fluoresced red when under a mercury lamp. The X-ray data indicated well defined calcium meta silicate, wollastonite form.

EXAMPLE IV

Another sample of zinc orthosilicate was made from the two solutions prepared as follows:

Solution A

|  | G. |
|---|---|
| Sodium silicate solution (8.7% $Na_2O$, 28.0% $SiO_2$) | 4860 |
| NaOH | 2890 |
| Deionized water | 18,990 |

Solution B

| | |
|---|---|
| $ZnSO_4 \cdot 7H_2O$ | 12,770 |
| $MnSO_4 \cdot H_2O$ | 77.1 |
| Deionized water | 14,000 |

The solution were fed into the mixer through the injection nozzles. The mixing blades were rotated at 3000 r.p.m. Solution A was fed by a positive displacement metering pump at the rate of 100 ml./min. Solution B was fed by another pump operating at the rate of 114 ml./min. The effluent recovered from the discharge spout had a pH of 7.6.

The slurry from the reactor was spray dried at 330° F. The dried powder was then washed with deionized water, adjusted to pH 8.5–9.0 with ammonia, until there was no test for sulfate using a $BaCl_2$ solution. The dewatered cake was predried at 150° C. in a forced air oven. The resultant powder was calcined at 2000° F. in air for 1½ hours to yield a white powder which fluoresced a bright green under a mercury lamp, and had a well-defined X-ray pattern or zinc orthosilicate (willemite).

What is claimed is:

1. A process for the preparation of a metal silicate phosphor selected from the group consisting of calcium metal silicate and zinc orthosilicate comprising the steps of:

(a) continuously precipitating, as a homogeneous finely divided precipitate, an intimately mixed reactive hydrous oxide intermediate of said metal silicate phosphor by simultaneously mixing substantially stoichiometric proportionss of a source silica selected from a group consisting of an alkali metal silicate and silica hydrogel with a soluble salt of a metal selected from the group consisting of zinc and calcium and activator amounts of a soluble salt at least one metal selected for the group consisting of manganese and, lead and mixtures thereof,
(b) spray drying said precipitate in a spray dryer operated at an outlet temperature of about 300° F. to about 400° F.,
(c) washing said spray dried precipitate,
(d) drying said washed precipitate at about 130° C. to about 160° C.,
(e) firing said washed precipitate in the presence of air or steam at temperatures of about 1750° F. to about 2320° F. for a period of about 1.5 to about 2.0 hours, and
(f) recovering the metal silicate phosphor product.

2. The process according to claim 1 wherein the soluble metal salts are selected for the group consisting of nitrates, chlorides, sulfates and acetates.

3. The process according to claim 1 wherein the source of silica is an alkali metal silicate.

4. A process according to claim 1 wherein a calcium metal silicate phosphor is produced and a manganese salt is used in amounts between about 0.001 gram-atoms to 0.2 gram-atoms of manganese per mole of $SiO_2$.

5. A process according to claim 1 wherein a calcium meta silicate phosphor is produced and a lead salt is used in amounts between about 0.0005 gram-atoms to 0.1 gram-atoms of lead per mole of $SiO_2$.

6. A process according to claim 1 wherein a zinc orthosilicate phosphor is produced and a manganese salt is used in amounts between about 0.001 gram-atoms to 0.2 gram-atoms of manganese per mole of $SiO_2$.

References Cited
UNITED STATES PATENTS

| | | | |
|---|---|---|---|
| 2,210,087 | 8/1940 | Leverenz | 252—301.6 |
| 2,415,129 | 2/1947 | Froelich | 252—301.4 |
| 3,030,313 | 4/1962 | Alles | 252—301.4 |
| 3,205,036 | 9/1965 | Mooney et al. | 252—301.4X |

TOBIAS E. LEVOW, Primary Examiner

J. COOPER, Assistant Examiner

U.S. Cl. X.R.

252—301.4F